United States Patent
Qin

(10) Patent No.: US 7,292,660 B2
(45) Date of Patent: Nov. 6, 2007

(54) DELTA-PHASE DETECTION METHOD AND SYSTEM

(75) Inventor: Chunlan Qin, Beijing (CN)

(73) Assignee: Via Technologies, Inc., Taipei (TW)

( * ) Notice: Subject to any disclaimer, the term of this patent is extended or adjusted under 35 U.S.C. 154(b) by 701 days.

(21) Appl. No.: 10/801,537

(22) Filed: Mar. 17, 2004

(65) Prior Publication Data

US 2005/0207517 A1    Sep. 22, 2005

(51) Int. Cl.
H04L 27/06    (2006.01)

(52) U.S. Cl. .................................................. 375/344

(58) Field of Classification Search ............... 375/344, 375/340, 342, 355, 362; 370/503, 509
See application file for complete search history.

(56) References Cited

U.S. PATENT DOCUMENTS

| | | | | |
|---|---|---|---|---|
| 4,647,968 A | * | 3/1987 | Willis ........................ | 348/574 |
| 4,647,974 A | * | 3/1987 | Butler et al. ............... | 725/36 |
| 5,521,600 A | * | 5/1996 | McEwan ..................... | 342/27 |
| 5,748,682 A | * | 5/1998 | Mobin ........................ | 375/344 |
| 6,353,642 B1 | * | 3/2002 | Asahara et al. ............. | 375/344 |
| 6,393,071 B1 | * | 5/2002 | Bourzeix .................... | 375/340 |
| 6,437,824 B1 | * | 8/2002 | Suzuki et al. .............. | 348/222.1 |
| 6,496,488 B1 | * | 12/2002 | Cooley et al. .............. | 370/324 |
| 6,581,046 B1 | * | 6/2003 | Ahissar ...................... | 706/15 |
| 6,625,222 B1 | * | 9/2003 | Bertonis et al. ............ | 375/259 |
| 6,930,989 B1 | * | 8/2005 | Jones, IV et al. .......... | 370/335 |
| 7,092,408 B1 | * | 8/2006 | Isaksen ....................... | 370/503 |

* cited by examiner

Primary Examiner—Khanh C. Tran
(74) Attorney, Agent, or Firm—Rabin & Berdo, PC

(57) ABSTRACT

A delta-phase detection method for real-time identifying a burst sequence in a received signal. The delta-phase detection method calculates phase differences between every two consecutive samples of the received signal, and counts the number of successive phase differences that are within a predetermined allowable detecting range. The end of the burst sequence is detected if the counting number is within a valid counting range. The valid counting range is determined according to an expected duration of the burst sequence. The frequency of the burst sequence can be calculated by a simple linear equation. A delta-phase detection system is also provided in the present invention, comprising a band pass filter, a delta-phase calculator, a low pass filter, and a flat line detector. The delta-phase detection system can be easily implemented in a digital signal processor of a mobile station to identify the FCCH burst sequence and compute the burst frequency.

26 Claims, 5 Drawing Sheets

DELTA-PHASE DETECTION METHOD AND SYSTEM

BACKGROUND OF THE INVENTION

1. Field of the Invention

The present invention relates to wireless communication systems, and more particularly, to a method of maintaining synchronization by detecting a burst sequence in wireless communication systems.

2. Description of the Related Art

Wireless communication systems principally involve voice and data communications between a mobile station and a base station. Most of the wireless communication systems operate on a set of standards that regulates the transmission frequencies, protocols, and other communication specifications. An example of the telecommunication standard is Global System for Mobile communication (GSM). FIG. 1 illustrates the layout of a conventional GSM network. A mobile station (MS) 100 is carried by a mobile subscriber. A base station subsystem 118 includes at least one base station (BTS) 102 and a base station controller (BSC) 104. The base station subsystem 118 controls the radio link between the MS 100 and the BTS 102. The central of a network subsystem 120 comprises a mobile services switching centre (MSC) 106. The MSC 106 performs the switching of calls between the MS 100 and other fixed or mobile network users, as well as management of mobile services. The MSC 106 connects with a gateway MSC (GMSC) 108, an equipment identity register (EIR) 110, an authentication centre (AUC) 112, a home location register (HLR) 114, and a visitor location register (VLR) 116.

In GSM system, each subscriber does not employ a communication channel alone, but shares the communication channel with up to seven other users. GSM system is an application of Time Division Multiple Access (TDMA). In a TDMA system, the received signal is not a continuous stream, but consists of timeslots separated by guard periods.

When a subscriber switches on a mobile station 100 to communicate with a base station 102, the mobile station 100 must establish time synchronization with the base station 102 to properly receive information. As shown in FIG. 2, the mobile station 100 has an internal frequency reference, typically a crystal oscillator 216. The frequency of the crystal oscillator 216 varies with temperature, time, and environmental conditions. The crystal oscillator 216 provides a reference frequency to a radio frequency (RF) phase lock loops (PLL) 220 and an intermediate frequency (IF) PLL 218. The RF PLL 220 generates a local oscillator frequency to down-convert the received RF signal. The PLL local oscillator frequency must be precisely matched the frequency of the received signal to accurately modulate information carried by the signal. In order to maintain the synchronization between the mobile station 100 and the rest of the network, the local oscillator frequency is periodically adjusted by a burst sequence in a Frequency Connect Channel (FCCH). The FCCH burst sequence is a sinusoid (a section of sine wave) having a frequency equals to a quarter (¼) of the transmission bit rate. For example, the transmission bit rate of the GSM system is 270.8 kilo-bits per second (Kb/s), so the burst frequency is 67.7 Kilohertz (kHz). The FCCH burst sequence will last for 577 micro second (µs), as each timeslot in the GSM system is 577 µs.

Conventional methods for burst frequency identification are generally divided into three categories: frequency, phase, and magnitude. Frequency detection methods are widely used because frequency is usually immune to noise and distortion. The burst frequency is identified by observing an acute peak in the frequency domain. Phase detection methods identify the burst frequency by storing and examining the phase of each sample in a received signal. If the phase increases linearly for a period of time, the received signal is assumed to be a sinusoid and the rate of change of phase is the frequency of the sinusoid. Amplitude detection methods are usually not applicable because amplitude is too sensitive to noise and distortion induced by environmental factors. However, the frequency detection methods need a spectrum transformation such as Fast Fourier Transform (FFT) to convert frequency into time, and the spectrum transformation is usually very time-consuming. Thus, the frequency detection method is not suitable for real-time applications such as FCCH burst search in the GSM system. The calculations involved in the phase detecting method as well as detecting a line with uncertain slope are relatively complex.

U.S. Pat. No. 6,393,071 describes a method for identifying a FCCH burst frequency by determining the mean and variance of zero crossings of the sampled data. The FCCH burst frequency is identified if a calculated indicator becomes greater than a predetermined threshold. The start of the FCCH burst sequence is determined by the minimum variance of the burst frequency. The invention disclosed in this US patent identifies the FCCH burst sequence based on observing the periods between consecutive zero crossings, as the periods are expected to be the same if the sampled data is a sinusoidal with constant frequency.

The present invention provides a delta-phase detection method for real-time identifying the frequency of a burst sequence in a received signal, as well as locating the end of the burst sequence. In comparison with prior art, the method disclosed in the present invention only requires simple calculations to identify the frequency of the burst sequence.

The delta-phase detection method is valid for identifying burst sequences of any length in a wide range of frequency.

SUMMARY OF THE INVENTION

The object of the present invention is to detect a burst sequence and locate the end of the burst sequence in a received signal. The end of the burst sequence is used as a timing reference for the receiver.

Another object of the present invention is to identify the frequency of a burst sequence in a simple, fast, and low-cost manner. The burst frequency is used to adjust the local oscillator frequency to maintain the synchronization between the receiver and the transmitter.

In order to achieve these objects, the present invention provides a delta-phase detection method for real-time identifying a burst sequence in a received signal. First, phase differences (delta phases) of any two consecutive samples in the received signal are calculated. If the received signal contains a burst sequence, the phase differences will be substantially constant over a period of time. Then, the number of successive phase differences within an allowable detecting range is determined by comparing each phase difference with an upper threshold and a lower threshold. The allowable detecting range is determined according to a factor indicating an error tolerance. The number of successive phase differences within the allowable detecting range is then compared to a valid counting range, and if this number is within the valid counting range, the burst sequence is found. The valid counting range is determined according to an expected duration of the burst sequence. For example, in the case of detecting a FCCH burst in the GSM system, the expected duration is 577 µs. The corresponding valid counting range is normally set to be 122-148 for a sampling rate of 270.8 kHz. Once the burst sequence is detected, the frequency of the burst sequence can be estimated using a simple equation.

The delta-phase detection method provided in the present invention further comprises band-pass filtering the received signal, low-pass filtering the phase differences, and adjusting a local oscillator frequency. The received signal is first band-pass filtered to eliminate channel noise. After calculating the phase differences, sharp variations of the phase differences caused by channel distortion are smoothed by low-pass filtering the phase differences. Once the burst sequence is detected, the crystal oscillator received the estimated burst frequency to generate a reference frequency for the RF PLL and IF PLL.

The present invention also provides a delta-phase detection system to perform the delta-phase detection method described above. The delta-phase detection system can be implemented in a digital signal processor of a mobile station for maintaining synchronization between the mobile station and the rest of the network. The delta-phase detection system comprises a band pass filter, a delta-phase calculator, a low pass filter, a flat line detector, and a frequency estimator. The band pass filter reduces interference and noise in the received signal by only allowing certain range of frequency to pass through the filter. The delta-phase calculator computes phase differences between any two consecutive samples in the received signal. The low pass filter receives the phase differences from the delta-phase calculator, and blocks sharp changes in the phase differences. The flat line detector identifies the burst sequence by comparing each of the phase differences with an allowable detecting range, and counting the number of successive phase differences within the allowable range. The frequency estimator receives an average phase difference from the flat line detector when a burst sequence is detected, and it calculates a burst frequency by a simple mathematical equation.

BRIEF DESCRIPTION OF THE DRAWINGS

The present invention can be more fully understood by reading the subsequent detailed description in conjunction with the examples and references made to the accompanying drawings, wherein.

DETAILED DESCRIPTION OF THE INVENTION

Figure 1:
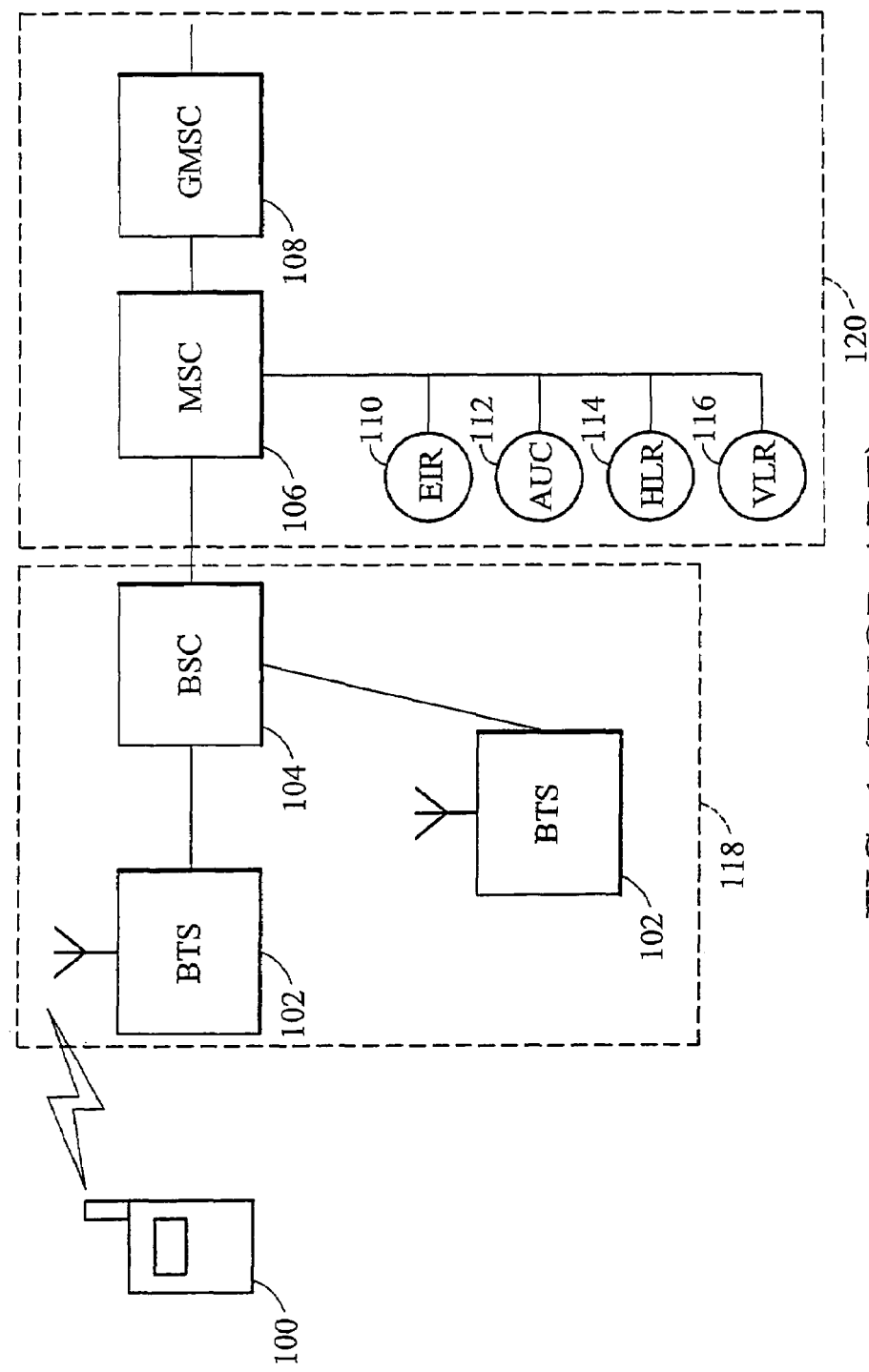
FIG. 1 is a block diagram showing the layout of a conventional GSM network.
Figure 2:
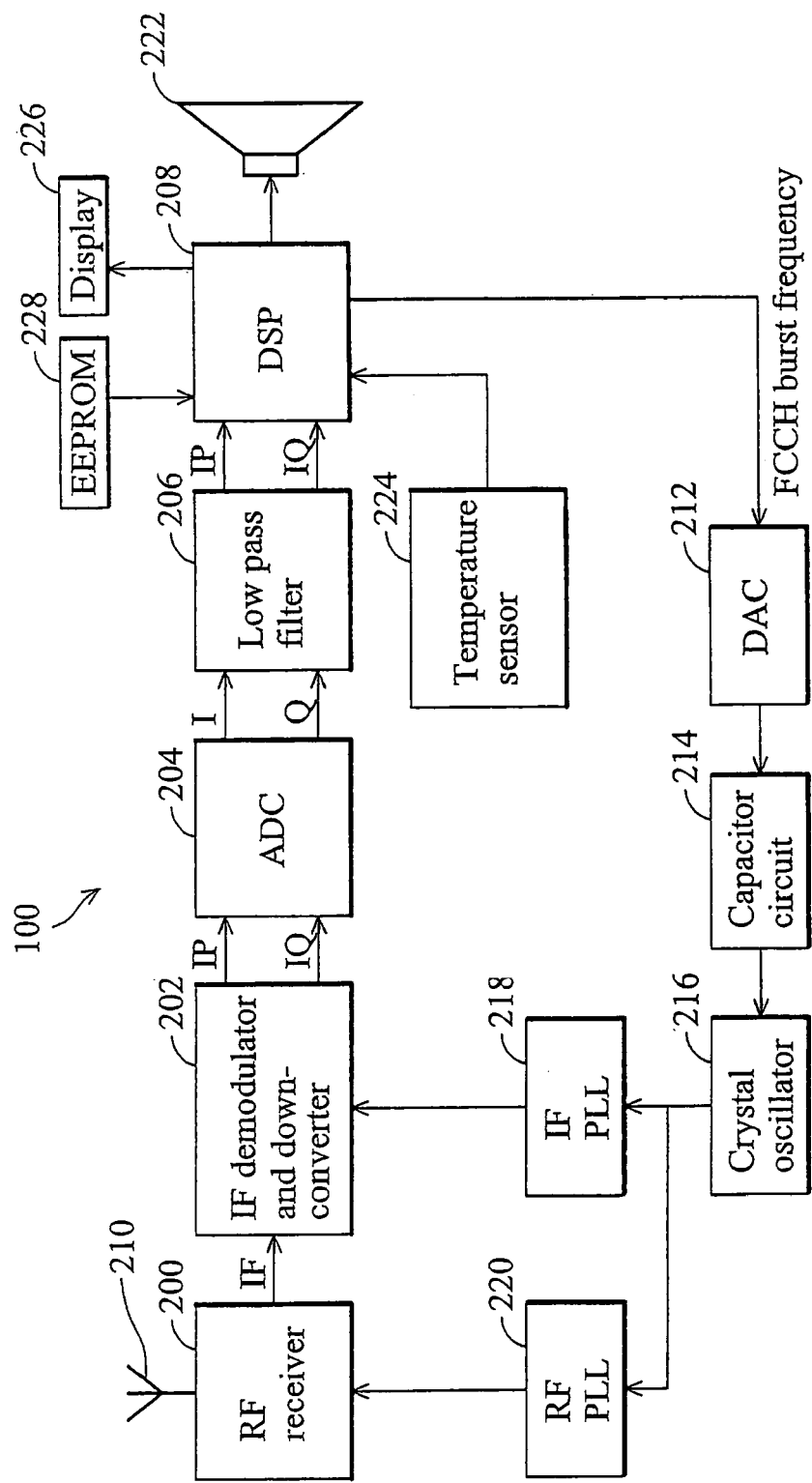
FIG. 2 is a block diagram showing a mobile station.

FIG. 2 illustrates function blocks of the receiving section in a mobile station. The mobile station comprises a RF receiver 200 coupled to an antenna 210 for receiving a RF signal. The RF receiver 200 down-converts the RF signal to an intermediate frequency (IF) signal according to a RF PLL 220. In GSM system, most RF signals transmit at 800 MHz, 1800 MHz, and 1900 MHz, whereas IF is usually around 200 MHz. IF demodulator and down-converter 202 demodulates the IF signal to a base-band analog signal with an in-phase (P) component and a quadrature (Q) component. An Analog-Digital Converter (ADC) 204 and a low pass filter 206 processes the base-band analog signal into a low-pass filtered digital signal. A digital signal processor (DSP) 208 receives this signal and drives a speaker 222 to hear the voice, or to display data in display 226. The instructions used to control the DSP 208 are stored in an electrically erasable programmable read only memory EEPROM 34. The DSP 208 also receives information from a temperature sensor 224. The present invention is implemented in the DSP 208 to monitor the received signal for identifying the FCCH burst sequence. The DSP 208 then routes the frequency of the FCCH burst sequence to a Digital-Analog Converter (DAC) 212. The analog FCCH burst frequency alters the voltage level of a capacitor circuit 214, which in turn controls the frequency of a crystal oscillator 216. The crystal oscillator 216 is expected to generate a reference frequency precisely matched to the received signal. Both RF PLL 220 and IF PLL 218 receive the reference frequency as a reference clock.

The present invention utilizes the characteristic of sine waves to identify if the received signal is a sine wave for a period of time. Assuming that the received signal is sampled at a particular point once every cycle, the change of phase (delta phase) between any two consecutive samples should be substantially constant as the frequency is substantially constant. As a result, a section of sine wave can be detected by observing a plurality of the phase differences. The complex sine wave of FCCH burst sequence can be expressed as:

$$x(n) = I(n) + j*Q(n)$$
$$= \cos\left(2\pi\frac{f}{f_s}*n + \varphi_0\right) + j*\sin\left(2\pi\frac{f}{f_s}*n + \varphi_0\right)$$

The complex sine wave consists of an in-phase component I(n) and a quadrature component Q(n). The above formula of the complex sine wave shows that the phase difference (delta phase) between any adjacent samples is:

$$\Delta \varphi = 2\pi \frac{f}{f_s}$$

From the above formula of calculating the delta phase, the delta phase ($\Delta\phi$) is substantially constant if the frequency (f) of the complex sine wave is substantially constant. By changing the subject of this formula, the frequency (f) of the sine wave could be easily calculated using the following formula.

$$f = \Delta\varphi \frac{f_s}{2\pi}$$

Figure 3:
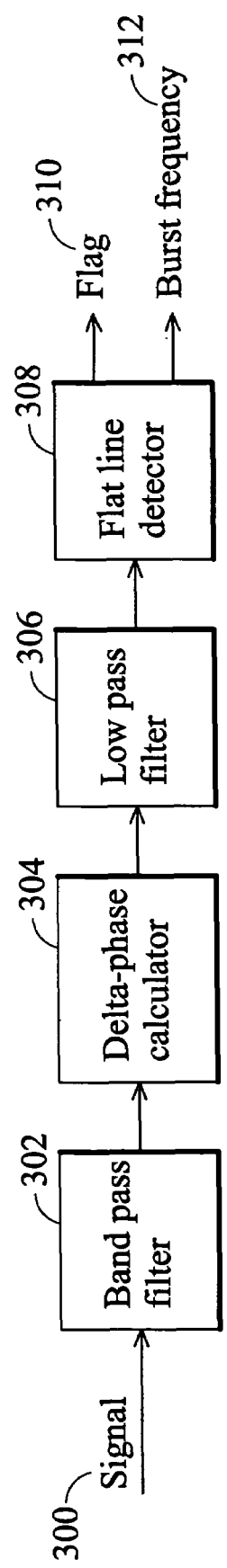
FIG. 3 is a block diagram showing a delta-phase detection system.
Figure 4:
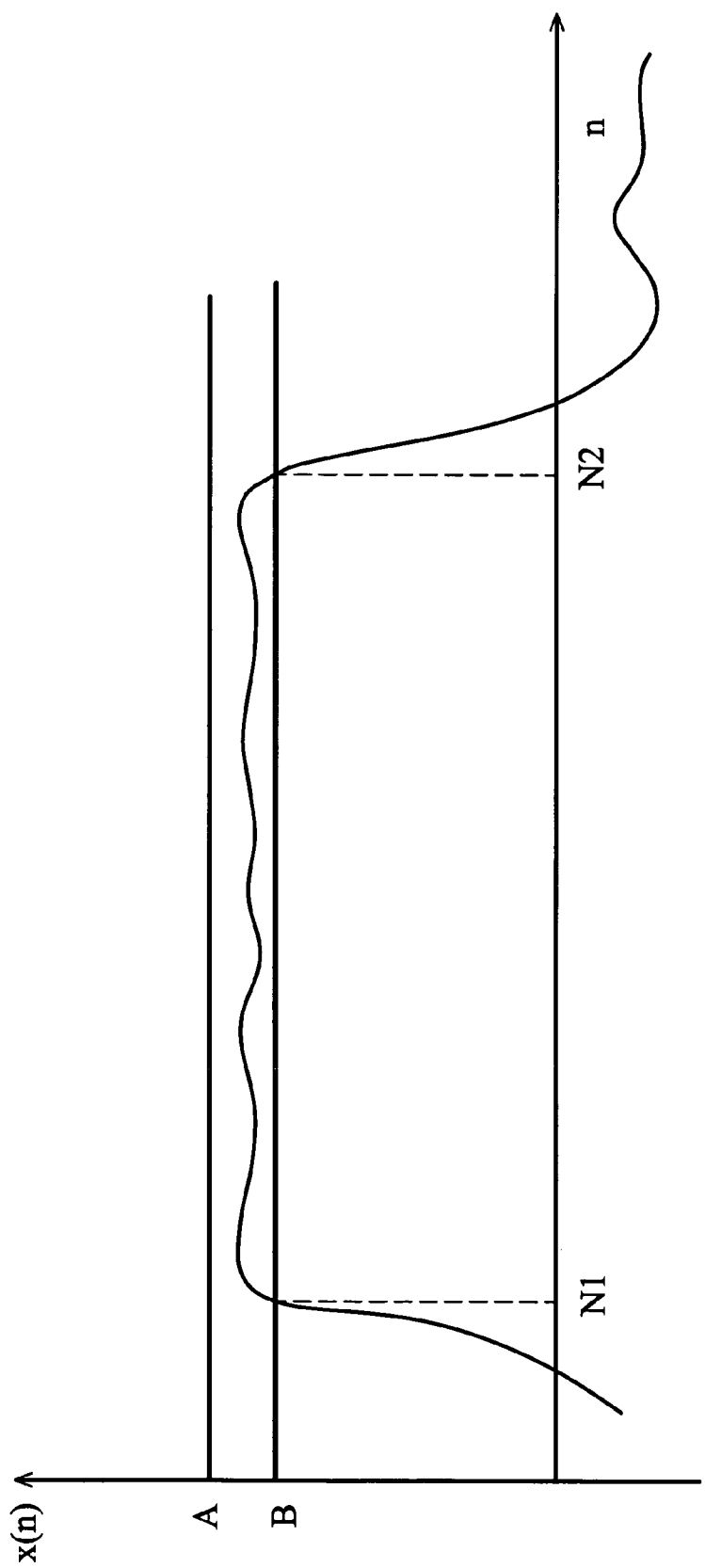
FIG. 4 is a graph showing the principle of detecting a burst sequence disclosed in the present invention.

FIG. 3 is a simple block diagram illustrating an embodiment of the present invention. A band pass filter 302 receives a signal 300 and filters the signal 300 to eliminate noise and distortion. The signal 300 is a base-band digital signal with an in-phase (P) component and a quadrature (Q) component. If the signal 300 is a FCCH burst sequence, the delta phases of any two consecutive samples of the signal 300 will be substantially constant. A delta-phase calculator 304 receives the output of the band pass filter 302, and computes the phase differences ($\Delta\phi$) between consecutive samples. The output of the band pass filter 302 is expressed as (I(n),Q(n)), in which I is the in-phase (real) part and Q is the quadrature (imaginary) part of the digital signal. The delta-phase calculator 304 performs the following calculations.

delta phase, and counts the number of successive delta phases within an allowable detecting range. In FIG. 4, the allowable detecting range is defined by two values, A and B. A and B are values on the vertical axis of the diagram, and are upper and lower thresholds determined by a factor S. The factor S determines an error tolerance of the delta-phase detection system. In practice, the factor s is usually set at 9% (0.09), indicating an offset of up to 9% away from the estimated burst frequency is acceptable in the system. On the horizontal axis, N1 and N2 are two samples indicating the start and the end of the successive delta phases within the allowable detecting range. The flat line detector counts the number of samples from N1 to N2 in order to determine whether the received signal contains a burst sequence with an expected length. The number of successive delta phases within the allowable detecting range has to be large enough to ensure that the frequency of the received signal is substantially constant for a sufficient period of time. The FCCH burst sequence is a sine wave with a constant frequency (67.7 kHz) for 577 μs, accordingly, the expected number of successive delta phases within the allowable detecting range is around 156. In practice, a valid counting range for determining the FCCH burst sequence is roughly set to be 122 to 148. A FCCH burst sequence is identified if the number of successive delta phases within the allowable detecting range is between 122 and 148. The frequency of the burst sequence can be simply estimated by the following equation.

$$y(n) = I(n)*I(n-1) + Q(n)*Q(n-1)$$

$$z(n) = Q(n)*Q(n-1) - I(n)*I(n-1)$$

$$\sin(\Delta\varphi') = \frac{|z(n)|}{\sqrt{y(n)^2 + z(n)^2}} \approx \frac{|z(n)|}{\max(|y(n)|,|z(n)|) + 0.5*\min(|y(n)|,|z(n)|)}$$

$$\Delta\varphi' = \begin{cases} 0.375\pi * \sin(\Delta\varphi) = 0.375\pi * \frac{|z(n)|}{|y(n)| + 0.5*|z(n)|} & |y(n)| \geq |z(n)| \\ 0.75\pi * \sin(\Delta\varphi) - 0.25\pi = 0.75\pi * \frac{|z(n)|}{|z(n)| + 0.5*|y(n)|} - 0.25\pi & |y(n)| < |z(n)| \end{cases}$$

$$\Delta\varphi = \begin{cases} \Delta\varphi' & z(n) > 0, y(n) > 0 \\ -\Delta\varphi' & z(n) < 0, y(n) > 0 \\ \pi - \Delta\varphi' & z(n) > 0, y(n) < 0 \\ \pi + \Delta\varphi' & z(n) < 0, y(n) < 0 \end{cases}$$

$\Delta\phi'$ is the counterpart of $\Delta\phi$ in the first domain no matter which domain $\Delta\phi$ locates.

A low pass filter 306 receives the phase differences calculated by the delta-phase calculator 304. The main objective of the low pass filter 306 is to remove high frequency as high frequency in the signal is normally noise. A flat line detector 308 receives the low-passed phase differences from the low pass filter 306, and outputs a flag and an estimated burst frequency.

FIG. 4 is a diagram illustrating the function of the flat line detector 308 in FIG. 3. The flat line detector examines each $$f = \frac{(A+B)*f_s}{4\pi}$$

where A and B are the upper and lower thresholds, and $f_s$ is the sampling frequency.

Figure 5:
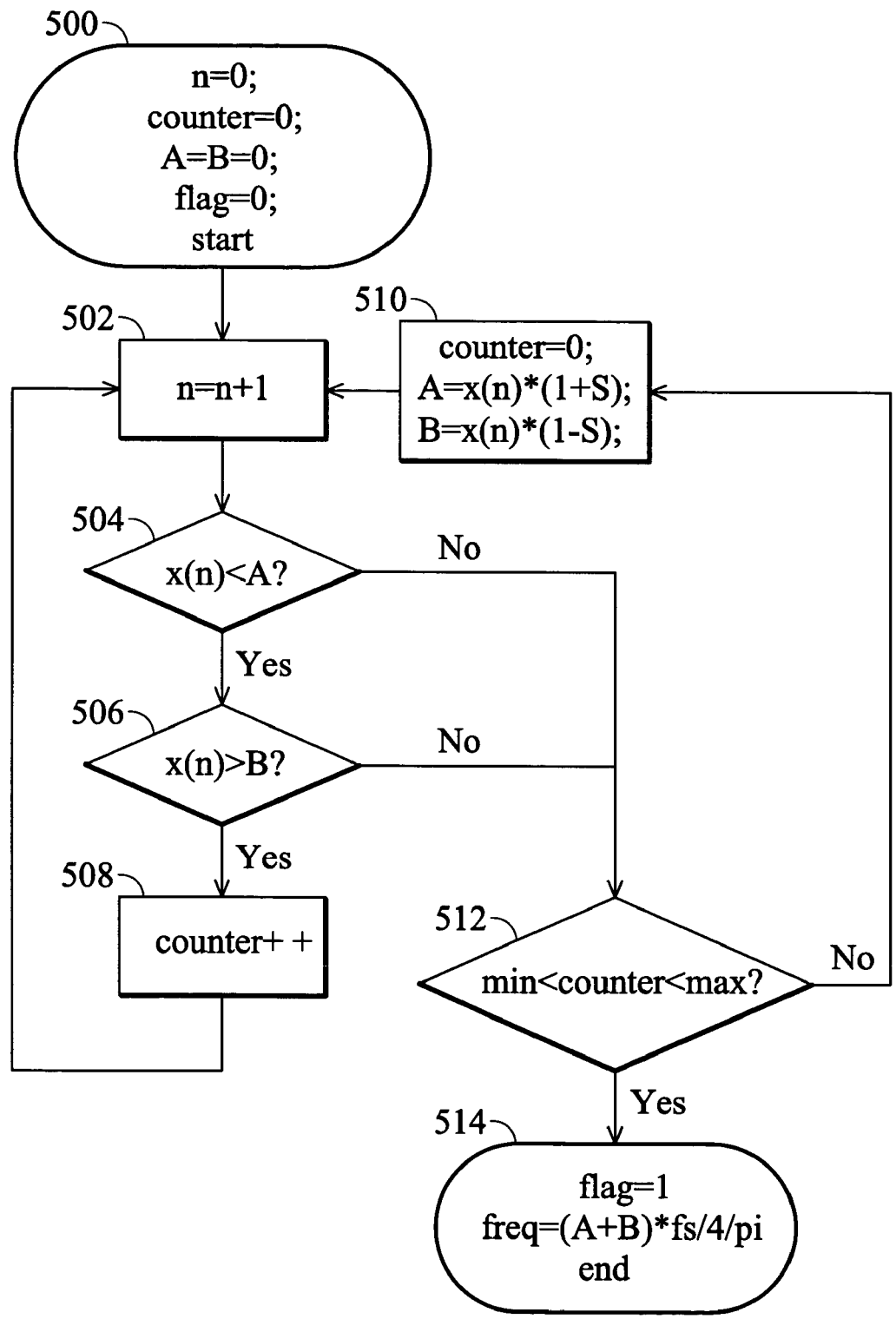
FIG. 5 is a flow chart showing the logic of detecting a burst sequence according to the method of the present invention.

FIG. 5 is a flow chart showing the logic of the flat line detector. A sample number (n) of the delta phase received by the flat line detector, a counter, an upper threshold A, a lower thresholds B, and a flag are initialized in step 500. The value of each delta phase is first compared to the upper threshold (A) in step 504. The upper threshold (A) and the lower threshold (B) are calculated in step 510 according to a predetermined factor S. When processing the first delta phase (n=1), the answer to step 504 is always a 'no' as A is still 0 at the time. The program then processes step 510 to set A to be higher than the first delta phase by a predetermined proportion, and set B to be lower than the first delta phase by the same proportion. This predetermined proportion indicates the maximum allowable fluctuation of the delta phase. The sample number is incremented in step 502, and the next delta phase is compared to the updated upper threshold (A) in step 504. If the delta phase is less than A, the delta phase is then compared to the lower threshold (B) in step 506. The counter is incremented in step 508 if the delta phase is less than A and greater than B. The flat line detector repeats processing steps 502 to 508 in order to count the number of samples with delta phase between A and B. Once a most recently received delta phase is not between A and B, the program executes step 512 to check if the counter is within a valid counting range. The valid counting range is defined by the allowable minimum (min) and maximum (max) length of the flat line set according to the duration of the expected burst sequence. The program executes step 514 if the counter is within the valid counting range. In step 514, the flat line detector sets a flag to indicate a burst sequence is detected, and computes the burst frequency by first averaging A and B, then multiplying the sampling frequency over $2\pi$. If the counter is less than the minimum length (min) or greater than the maximum length (max) in step 512, the program executes step 510 to reset the counter, as well as updating the two thresholds according to the most recent received delta phase. The program keeps searching until detecting a burst sequence with a desired duration.

The outputs of the flat line detection are used to maintain the synchronization between the mobile station and the network in both timing and frequency manners. The flag locates the end of the burst sequence, and the burst frequency adjusts the crystal oscillator to match the frequency of the network. The present invention is suitable for real-time application as it detects the burst sequence and identifies its frequency immediately after receiving the burst sequence. In comparison with the conventional detection methods, the delta-phase detection method of the present invention is simple and easy for hardware realization.

Finally, while the invention has been described by way of example and in terms of the above, it is to be understood that the invention is not limited to the disclosed embodiment. On the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A delta-phase detection method for identifying a burst sequence in a received signal, comprising the steps of:
    calculating phase differences of every two consecutive samples in the received signal;
    detecting the burst sequence and locating an end of the burst sequence by comparing each of the phase differences with an upper threshold and a lower threshold, wherein locating the end of the burst sequence further comprises:
    counting a number of successive phase differences within an allowable detecting range, and storing the number of successive phase differences in a counter;
    providing a valid counting range according to an expected duration of the burst sequence;
    comparing the number in the counter with the valid counting range; and
    locating the end of the burst sequence when the number in the counter is within the valid counting range; and
    estimating a burst frequency of the burst sequence once the burst sequence is detected.

2. The method according to claim 1, further comprising the steps of:
    band-pass filtering the received signal to eliminate noise before calculating the phase differences; and
    low-pass filtering the phase differences to smooth variations of the phase differences.

3. The method according to claim 1, wherein detecting the burst sequence and locating the end of the burst sequence further comprises:
    providing a factor indicating a maximum fluctuation for the phase differences;
    determining the upper threshold and the lower threshold of the allowable detecting range according to the factor; and
    comparing each of the phase differences with the upper threshold and the lower threshold.

4. The method according to claim 1, wherein estimating the burst frequency includes using a linear equation to calculate the burst frequency of the burst sequence from the upper threshold and the lower threshold.

5. The method according to claim 4, wherein the linear equation for estimating the burst frequency is averaging the upper threshold (A) and the lower threshold (B), and multiplying a sampling frequency ($f_s$) over two times a ratio of the circumference of a circle to its diameter $$\left(f = \frac{(A+B)*f_s}{4\pi}\right).$$

6. The method according to claim 1, further comprising adjusting an output frequency of a local oscillator according to the burst frequency, thereby maintaining frequency synchronization.

7. A signal processor for identifying a burst sequence in a received signal, comprising:
    means for calculating phase differences of every two consecutive samples in the received signal;
    means for detecting the burst sequence and locating an end of the burst sequence by comparing each of the phase differences with an upper threshold and a lower threshold, wherein said means for locating the end of the burst sequence further comprises:
    means for counting a number of successive phase differences within an allowable detecting range, and storing the number of successive phase differences in a counter;
    means for providing a valid counting range according to an expected duration of the burst sequence;
    means for comparing the number in the counter with the valid counting range; and means for locating the end of the burst sequence when the number in the counter is within the valid counting range; and means for estimating a burst frequency of the burst sequence once the burst sequence is detected.

8. The signal processor according to claim 7 further comprising:
means for band-pass filtering the received signal to eliminate noise before calculating the phase differences; and
means for low-pass filtering the phase differences to smooth variations of the phase differences.

9. The signal processor according to claim 7, the means for detecting the burst sequence and locating the end of the burst sequence performs the steps of:
providing a factor indicating a maximum fluctuation for the phase differences;
determining the upper threshold and the lower threshold of the allowable detecting range according to the factor; and
comparing each of the phase differences with the upper threshold and the lower threshold.

10. The signal processor according to claim 7 further comprising means for adjusting an output frequency of a local oscillator according to the burst frequency.

11. A delta-phase detection system for identifying a burst sequence in a received signal, comprising:
a band pass filter, receiving and filtering the received signal to eliminate noise;
a delta-phase calculator, coupling to the band pass filter and calculating phase differences of every two consecutive samples in the received signal;
a low pass filter, smoothing variations of the phase differences calculated by the delta-phase calculator; and
a flat line detector, detecting the burst sequence, locating the end of the burst sequence by comparing each of the phase differences received from the low pass filter with an upper threshold and a lower threshold, and estimating a burst frequency of the burst sequence by using a linear equation to calculate the burst frequency of the burst sequence from the upper threshold and the lower threshold once detecting the burst sequence, wherein the linear equation is averaging the upper threshold (A) and the lower threshold (B), and multiplying a sampling frequency ($f_s$) over two times a ratio of the circumference of a circle to its diameter $$\left(f = \frac{(A+B)*f_s}{4\pi}\right).$$

12. A method for maintaining synchronization between a mobile radio station having a local oscillator oscillating at a local oscillating frequency, and a base station by identifying a burst sequence in a received signal received by the mobile radio station, comprising the steps of:
determining a burst frequency of the burst sequence by a delta-phase detecting method, wherein the delta-phase detecting method comprises:
calculating phase differences of every two consecutive samples in the received signal;
comparing each of the phase differences with an upper threshold and a lower threshold;
counting a number of successive phase differences within an allowable detecting range, and storing the number of successive phase differences in a counter;
providing a valid counting range according to an expected duration of the burst sequence;
comparing the number in the counter with the valid counting range;
locating the end of the burst sequence when the number in the counter is within the valid counting range;
estimating the burst frequency of the burst sequence once the burst sequence is detected; and
adjusting the local oscillating frequency of the local oscillator according to the frequency of the burst sequence to maintain the synchronization.

13. The method according to claim 12, wherein the delta-phase detecting method further comprises the steps of:
band-pass filtering the received signal to eliminate noise before calculating the phase differences; and
low-pass filtering the phase differences to smooth variations of the phase differences.

14. The method according to claim 12, wherein comparing each of the phase differences with the upper threshold and the lower threshold further comprises:
providing a factor indicating a maximum fluctuation for the phase differences;
determining the upper threshold and the lower threshold of an allowable detecting range according to the factor.

15. The method according to claim 12, wherein estimating the burst frequency includes using a linear equation to calculate the burst frequency of the burst sequence from the upper threshold and the lower threshold.

16. The method according to claim 15, wherein the linear equation for estimating the burst frequency is averaging the upper threshold (A) and the lower threshold (B), and multiplying a sampling frequency ($f_s$) over two times a ratio of the circumference of a circle to its diameter $$\left(f = \frac{(A+B)*f_s}{4\pi}\right).$$

17. A delta-phase detection method for identifying a burst sequence in a received signal, comprising the steps of:
calculating phase differences of every two consecutive samples in the received signal;
detecting the burst sequence and locating an end of the burst sequence by comparing each of the phase differences with an upper threshold and a lower threshold; and
estimating a burst frequency of the burst sequence by using a linear equation to calculate the burst frequency of the burst sequence from the upper threshold and the lower threshold once detecting the burst sequence, wherein the linear equation is averaging the upper threshold (A) and the lower threshold (B), and multiplying a sampling frequency (fs) over two times a ratio of the circumference of a circle to its diameter $$\left(f = \frac{(A+B)*f_s}{4\pi}\right).$$

18. The method according to claim 17, further comprising the steps of:
band-pass filtering the received signal to eliminate noise before calculating the phase differences; and
low-pass filtering the phase differences to smooth variations of the phase differences.

19. The method according to claim 17, wherein detecting the burst sequence and locating the end of the burst sequence further comprise:

providing a factor indicating a maximum fluctuation for the phase differences;

determining the upper threshold and the tower threshold of an allowable detecting range according to the factor;

comparing each of the phase differences with the upper threshold and the lower threshold;

counting a number of successive phase differences within the allowable detecting range, and storing the number in a counter;

providing a valid counting range according to an expected duration of the burst sequence;

comparing the counter with the valid counting range; and locating the end of the burst sequence when the counter is within the valid counting range.

20. A method for maintaining synchronization between a mobile radio station having a local oscillator oscillating at a local oscillating frequency, and a base station by identifying a burst sequence in a received signal received by the mobile radio station, comprising the steps of:

determining the frequency of the burst sequence by a delta-phase detecting method, wherein the delta-phase detecting method comprising:

calculating phase differences of every two consecutive samples in the received signal;

detecting the burst sequence and locating the end of the burst sequence by comparing each of the phase differences with an upper threshold and a lower threshold; and estimating a burst frequency of the burst sequence by using a linear equation to calculate the burst frequency of the burst sequence from the upper threshold and the lower threshold once detecting the burst sequence, wherein the linear equation is averaging the upper threshold (A) and the lower threshold (B), and multiplying a sampling frequency ($f_s$) over two times a ratio of the circumference of a circle to its diameter $$\left(f = \frac{(A+B) * f_s}{4\pi}\right);$$

and adjusting the local oscillating frequency of the local oscillator according to the frequency of the burst sequence to maintain the synchronization.

21. The method according to claim 20, wherein the delta-phase detecting method further comprises the steps of:

band-pass filtering the received signal to eliminate noise before calculating the phase differences; and low-pass filtering the phase differences to smooth variations of the phase differences.

22. The method according to claim 20, wherein detecting the burst sequence and locating the end of the burst sequence comparing each of the phase differences with the upper threshold and the lower threshold further comprises:

providing a factor indicating a maximum fluctuation for the phase differences;

determining the upper threshold and the lower threshold of an allowable detecting range according to the factor;

comparing each of the phase differences with the upper threshold and the lower threshold;

counting a number of successive phase differences within the allowable detecting range, and storing the number in a counter;

providing a valid counting range according to an expected duration of the burst sequence;

comparing the counter with the valid counting range; and locating the end of the burst sequence when the counter is within the valid counting range.

23. A signal processor for identifying a burst sequence in a received signal, comprising:

means for calculating phase differences of every two consecutive samples in the received signal;

means for detecting the burst sequence and locating the end of the burst sequence by comparing each of the phase differences with an upper threshold and a lower threshold; and means for estimating a burst frequency of the burst sequence by using a linear equation to calculate the burst frequency of the burst sequence from the upper threshold and the lower threshold once detecting the burst sequence, wherein the linear equation is averaging the upper threshold (A) and the lower threshold (B), and multiplying a sampling frequency ($f_s$) over two times a ratio of the circumference of a circle to its diameter $$\left(f = \frac{(A+B) * f_s}{4\pi}\right).$$

24. The signal processor according to claim 23 further comprising:

means for band-pass filtering the received signal to eliminate noise before calculating the phase differences; and means for low-pass filtering the phase differences to smooth variations of the phase differences.

25. The signal processor according to claim 23, the means for detecting the burst sequence and locating the end of the burst sequence performs the steps of:

providing a factor indicating a maximum fluctuation for the phase differences;

determining the upper threshold and the lower threshold of an allowable detecting range according to the factor;

comparing each of the phase differences with the upper threshold and the lower threshold;

counting a number of successive phase differences within the allowable detecting range, and storing the number in a counter;

providing a valid counting range according than expected duration of the burst sequence;

comparing the counter with the valid counting range; and locating the end of the burst sequence when the counter is within the valid counting range.

26. The signal processor according to claim 23, further comprising means for adjusting an output frequency of a local oscillator according to the burst frequency.

* * * * *